United States Patent
Xu et al.

(10) Patent No.: US 7,298,379 B2
(45) Date of Patent: Nov. 20, 2007

(54) LUMINANCE PRESERVING COLOR CONVERSION FROM YUV TO RGB

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 228 days.

(21) Appl. No.: 11/056,372

(22) Filed: Feb. 10, 2005

(65) Prior Publication Data
US 2006/0176313 A1    Aug. 10, 2006

(51) Int. Cl.
G06K 9/00 (2006.01)
G06K 9/38 (2006.01)
G09G 5/02 (2006.01)

(52) U.S. Cl. ............. 345/589; 345/591; 345/603; 348/557; 348/577; 358/516; 358/518; 358/520; 382/166; 382/251

(58) Field of Classification Search ........ 345/589–591, 345/597, 600, 603–605; 382/162–167, 251–252, 382/219; 358/512, 515–520; 348/557, 560, 348/577, 582, 566, 599, 612, 617, 630–631, 348/635, 639
See application file for complete search history.

(56) References Cited

U.S. PATENT DOCUMENTS

| | | | |
|---|---|---|---|
| 5,193,000 A * | 3/1993 | Lipton et al. | 348/43 |
| 5,465,164 A * | 11/1995 | Sugiura et al. | 382/252 |
| 6,075,887 A * | 6/2000 | Brett | 382/167 |
| 6,384,838 B1 * | 5/2002 | Hannah | 345/601 |
| 6,694,379 B1 * | 2/2004 | Hanko et al. | 719/329 |
| 2003/0063221 A1 * | 4/2003 | Stessen et al. | 348/678 |
| 2003/0160900 A1 * | 8/2003 | Dumitras et al. | 348/649 |
| 2004/0150655 A1 * | 8/2004 | Pau et al. | 345/604 |
| 2005/0060421 A1 * | 3/2005 | Musunuri et al. | 709/231 |

OTHER PUBLICATIONS

U.S. Appl. No. 10/985,364, filed Nov. 10, 2004, Ning Xu, et al.
D.B. Judd, G. Wyszecki, *Color in Business*, Science and Industry, 1975, 3rd ed., Wiley, New York.
C.A. Poynton, *A Technical Introduction to Digital Video*, 1996, John Wiley & Sons, Inc.
H. Kikuchi, H. Sato, S. Hasebe, N. Mizutani, S. Muramatsu, S. Sasaki, Z. Zhou, S. Sekine, Y. Abe, M. Nakashizuka, *Mapping of Fine Grayscale Data into the sRGB Color Space*, in Proc. ITC-CSCC 2002, Jul. 2002, pp. 16-19, Thailand.
G. Sharma, H. Joel Trussell, Digital Color Imaging, IEEE Transactions on Image Processing, Jul. 1997, pp. 901-932, vol. 6, No. 7.

* cited by examiner

*Primary Examiner*—Wesner Sajous
(74) *Attorney, Agent, or Firm*—Kenneth L. Sherman, Esq.; Michael Zarrabian, Esq.; Myers Dawes Andras & Sherman, LLP

(57) ABSTRACT

This invention presents a YUV to RGB conversion method which preserves high precision of luminance information in an original YUV image signal when converting it to RGB signal. The method can be used to convert the original YUV signal to arbitrary quantization levels in RGB space. In addition, this invention presents methods of pre-quantization and re-quantization as to compensate conventional YUV to RGB color conversion.

14 Claims, 5 Drawing Sheets

(a) Pre-quantization of YUV value (b) Assuming there is a conventional color conversion after the pre-quantization (c) The equivalence between the two if the YUV in-between has higher precision Pre-quantization of YUV signal so that the output can produce luminance preserving RGB signal by using the conventional color conversion method.

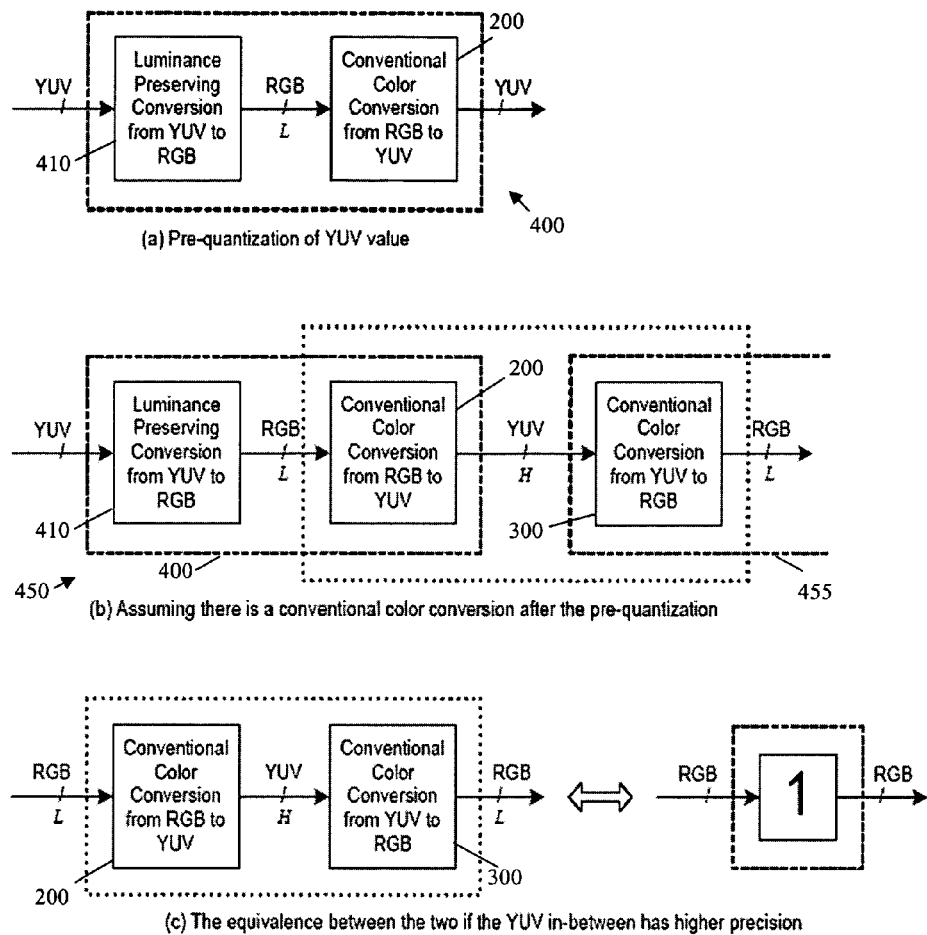
Fig. 4. Pre-quantization of YUV signal so that the output can produce luminance preserving RGB signal by using the conventional color conversion method.

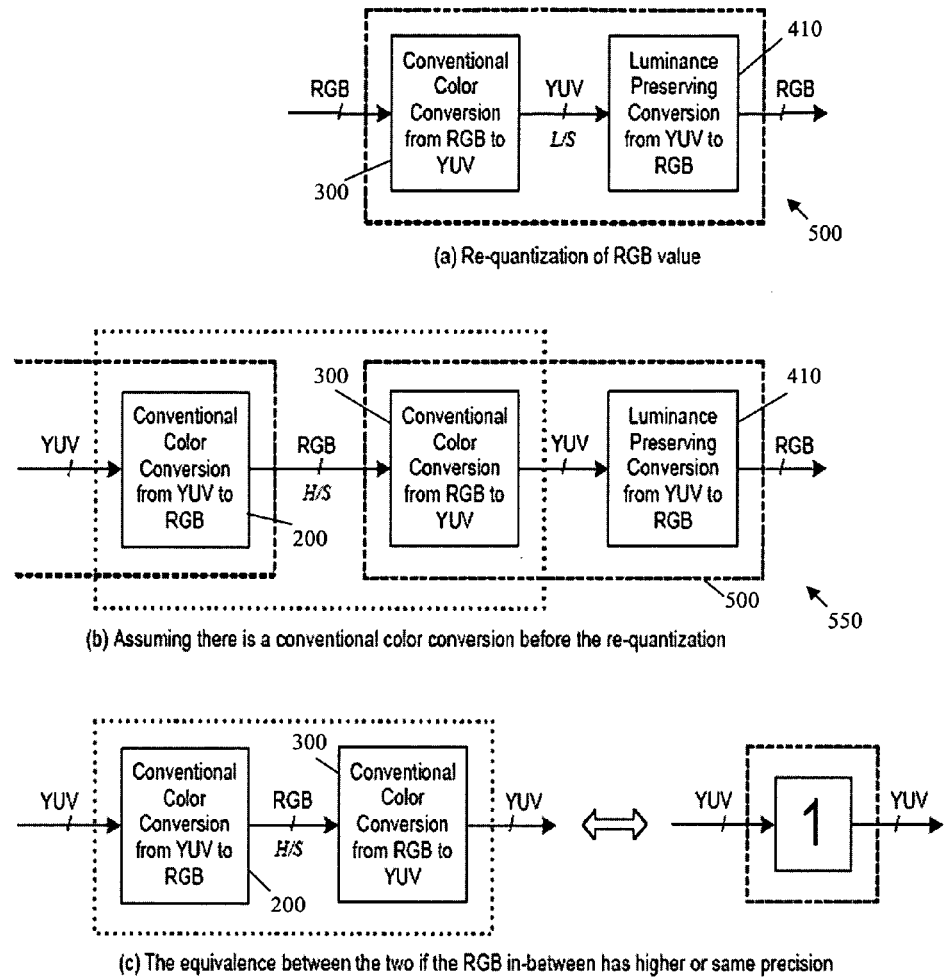
Fig. 5. Re-quantization of RGB signal in the case the input RGB signal is converted from same precision YUV signal using the conventional color conversion method.

LUMINANCE PRESERVING COLOR CONVERSION FROM YUV TO RGB

FIELD OF THE INVENTION

The present invention relates generally to video image processing and in particular to color conversion and quantization within the YUV (Y represents luminance, U a first color difference, and V a second color difference) and the RGB (Red, Green, Blue) color space.

BACKGROUND OF THE INVENTION

As the display technology advances, the RGB color space is commonly used in virtually every computer system as well as television, video etc. The RGB color space is easy to implement although it is non-linear with visual perception. In order to be displayed on RGB displays, images and videos coded in YUV space are converted into RGB signals (usually the 24-bit RGB true color signals).

Research has shown that the human eye is capable of distinguishing around 10 million different colors under optimal viewing conditions. The traditional true color display with 8-bit precision on each channel can display about 16.7 million colors, which is more than 10 million. However, the true color display is still not sufficient for human vision perception. This is mainly because of the non-uniformity, in the sense of human perception, of the RGB space. The non-uniformity leads to the result that in some regions of the RGB color space the different colors are perceived the same and in some other regions the colors jump by more than one JND (just noticeable difference). Therefore on the one hand, to reduce the color differences of neighboring quantization levels, higher bit-depth displays, including the higher bit processing chips and drivers, are becoming a trend in the display industry. On the other hand, with the existing color display that cannot achieve continuous perceptual colors, image processing methods are expected to produce perceptually better images.

The human visual system is much more sensitive to luminance than to chrominance. Research has shown that the human eye can distinguish roughly 463 different grayscales, which is about 9 bits, while it can only distinguish about 150 different hues and 50 different saturation levels. The traditional 24-bit true color display can display only less than 255 different shades of grayscales (considering some of them are indistinguishable), which is insufficient for human eyes. In addition, as the display is made brighter and brighter, the banding artifacts become more obvious between neighboring shades of gray scales in 24-bit displays.

In regards to converting YUV signals to RGB signals, the fact that the human vision is much more sensitive to luminance than to chrominance, makes it possible to manipulate the converted RGB color signals to preserve luminance while keeping the difference in the chrominance within a tolerable range.

BRIEF SUMMARY OF THE INVENTION

In one embodiment the present invention provides a method for color conversion from the YUV color space to the RGB color space, where the accuracy of converted RGB signals is constrained by the bit-depth (i.e., number of bits that can be used to present the signal). Such a color conversion method essentially preserves luminance information of the original color signal compared to the conventional color conversion methods that use simple rounding after a double precision transformation. By selecting the proper RGB values, the luminance difference between the input signal and output signal can essentially be minimized. However, the minimization of the luminance may result in a large difference in the chrominance (color) components between the input and output signals. Therefore, to maintain the color difference within a tolerable range, color conversion is formulated and solved as a constrained minimization problem.

As such, an example method of video image color conversion according to the present invention, comprises the steps of: receiving an image signal in YUV color space having a first precision; converting the image signal into a quantized RGB color space having a second precision; such that the luminance of the image signal is essentially preserved in the quantized RGB signal. The luminance difference between the signals before and after conversion is essentially minimized by trading off the chrominance differences. Minimizing the luminance difference includes the steps of constraining chrominance errors while essentially minimizing the luminance difference.

In another example, the conversion step further includes the steps of: determining a set of possible RGB signal values such that the difference in chrominance before and after conversion is constrained; and selecting an RGB signal value from the above possible RGB signal values that essentially minimizes the difference in luminance before and after the conversion.

In addition, because conventional color conversion from YUV to RGB color space is very commonly used in various hardware and chips, to achieve the same luminance preserving result for color conversion, in another aspect the present invention provides a pre-quantization method for YUV signals and a re-quantization method for RGB signals, to compensate the conventional conversion methods.

In another aspect the present invention provides a converter and video systems that implement the above example methods.

Other embodiments, features and advantages of the present invention will be apparent from the following specification taken in conjunction with the following drawings.

BRIEF DESCRIPTION OF THE DRAWINGS

FIG. 4(*a*) shows an example functional block diagram of pre-quantization of high precision YUV color to a same precision YUV color, according to an embodiment of the present invention.

FIG. 4(*b*) shows an example functional block diagram of a system, where pre-quantization of the system in FIG. 4(*a*) is used in front of a hardware system that immediately thereafter performs conventional color conversion.

FIG. 4(*c*) shows that to achieve luminance preserving RGB value in the output of the system in FIG. 4(*b*), the two consecutive conventional color conversions should be equivalent to an identity transformation.

FIG. 5(a) shows an example block diagram of re-quantization of an RGB color to a same precision RGB color, according to an embodiment of the present invention.

FIG. 5(b) shows an example function block diagram of a system, where re-quantization in FIG. 5(a) is used immediately after a system that contains a conventional color conversion before output.

FIG. 5(c) shows that to achieve luminance preserving RGB value in the output of the system in FIG. 5(b), the two consecutive conventional color conversions should be equivalent to an identity transformation.

In the drawings, like references indicate like elements.

DETAILED DESCRIPTION OF THE INVENTION

Figure 1:
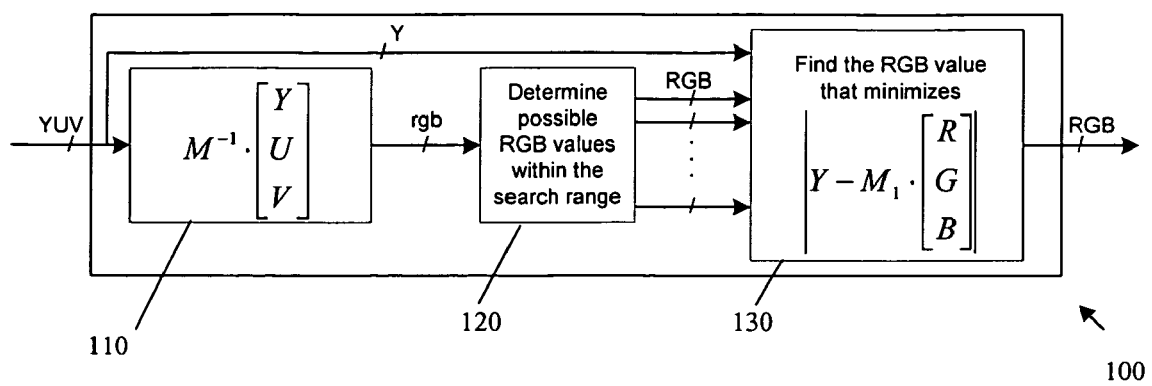
FIG. 1 shows an example functional block diagram of an example color space conversion from high precision YUV to high or low precision RGB according to an embodiment of the present invention.

In one embodiment, the present invention provides a luminance preserving color conversion method and system which can be utilized to convert arbitrary quantized or un-quantized YUV signals to arbitrary quantized RGB signals. In the following description, in representing a color component, upper case letters [R, G, B] and [Y, U, V] are used to indicate lower precision (e.g., 8-bit values) and lower case letters [r, g, b] and [y, u, v] are used to indicate the higher precision values, more bit or double precision. Further in the drawings, "L" on an input or output line indicates low precision, "H" on an input or output line indicates high precision, and "S" on an input or output line indicates same precision.

FIG. 1 shows a functional block diagram of an example system 100 for color space conversion from high precision YUV to high or low precision RGB, according to an embodiment of the present invention. An input YUV color signal is first converted to double precision rgb value in a conversion block 110, wherein the rgb value is used to determine a set of RGB values in a block 120, wherein one of the RGB values which essentially minimizes the luminance difference is selected in the selection block 130 as output of the system 100. In order to simplify the description, in this example, a 24-bit RGB signal is used as the system output.

Conversion between YUV and RGB can take many different formats depending on the standards used. The present invention is not dependent on any standard. An example of YUV to RGB conversion is provided in relation (1) below:

$$\begin{bmatrix} y \\ u \\ v \end{bmatrix} = M \cdot \begin{bmatrix} r \\ g \\ b \end{bmatrix} \qquad (1)$$

$$= \begin{bmatrix} M_1 \\ M_2 \\ M_3 \end{bmatrix} \cdot \begin{bmatrix} r \\ g \\ b \end{bmatrix},$$

where $M_1 = [\,0.299 \quad 0.587 \quad 0.114\,]$, $M_2 = [\,-0.169 \quad -0.332 \quad 0.500\,]$, $M_3 = [\,0.500 \quad -0.419 \quad -0.081\,]$, where $M = [M_1, M_2, M_3]^T$ is the conversion matrix, r, g, b and y are in the range [0, 1] and u and v are in the range [−0.5, 0.5].

The corresponding inverse conversion from YUV to RGB is provided in relation (2) below:

$$\begin{bmatrix} r \\ g \\ b \end{bmatrix} = M^{-1} \cdot \begin{bmatrix} y \\ u \\ v \end{bmatrix} \qquad (2)$$

$$= \begin{bmatrix} 1 & 0 & 1.407 \\ 1 & -0.345 & -0.717 \\ 1 & 1.779 & 0 \end{bmatrix} \cdot \begin{bmatrix} y \\ u \\ v \end{bmatrix}$$

In the example YUV to RGB conversation herein, given a high precision $[y, u, v]^T$ signal, first the corresponding high precision RGB values $[r, g, b]^T$ are obtained using relation (2) above. The resulting high precision $[r, g, b]^T$ is to be quantized to 8-bit RGB colors for display. The common practice has been to simply round the high precision $[r, g, b]^T$ to 8-bit $[R, G, B]^T$. However, this causes quantization errors in RGB color space, which can be transformed back to equivalent quantization errors in YUV color space.

As mentioned, the human eye is much more sensitive in luminance than in chrominance, and the quantization errors from simple rounding in RGB color space is perceptually non-uniform for luminance and chrominance components. To obtain a high quality 24-bit RGB image according to an embodiment of the present invention, the quantization error in luminance components is reduced and preferably essentially minimized by trading off the accuracy in chrominance components. In other words, a set of 8-bit RGB triples are found such that the quantization error in luminance components is essentially minimized. However, this minimization of luminance components is achieved at the expense of increasing the quantization errors in chrominance (color) components which will also cause color difference. Therefore, to keep the color difference within a tolerable range, the chrominance errors are constrained while minimizing luminance quantization errors.

Accordingly, the quantization is formulated as a constrained minimization problem. The quantization errors in luminance are minimized while ensuring that the difference between chrominance (colors) before and after quantization is constrained, such as according to example relation (3) below:

$$\begin{bmatrix} R \\ G \\ B \end{bmatrix} = \arg \min_{[R,G,B]^T \in D(y,u,v)} \left\| y - M_1 \cdot \begin{bmatrix} R \\ G \\ B \end{bmatrix} \right\|, \qquad (3)$$

where $D(y, u, v)$ is a range that for colors $[R, G, B]^T \in D$, the chrominance difference between $[R, G, B]^T$ and $[y, u, v]^T$ is tolerable (wherein x=arg min f(x) means x minimizes f(x)).

If the setup parameters of the display (i.e., the system white point, chromaticity coordinates of R, G and B, and the gamma law) are available, the colors can be converted into device independent color space, e.g., CIE Lab color space, and CIE 1994 color difference model used to calculate the color difference between the high precision $[r, g, b]^T$ color and the quantized $[R, G, B]^T$ colors. The CIE 1994 color difference model is based on CIELAB and attempted to derive local distortions of the CIELAB to make the color difference more uniform in the color space. CIELAB color space is directly based on CIE XYZ, which is device independent and at the root of all colorimetry. CIE94 color difference DE*94 is defined on CIE L*a*b* color space as follows:

For two colors $C1=[L1, a1, b1]^T$ and $C2=[L2, a2, b2]^T$ in L*a*b* color space, the CIE94 color difference DE* 94 is as example relation (4) below (wherein L, a and b are coordinates in L*a*b* color space):

$$DE^*94(C_1, C_2) = \sqrt{\left(\frac{dl}{kl \cdot sl}\right)^2 + \left(\frac{dc}{kc \cdot sc}\right)^2 + \left(\frac{dh}{kh \cdot sh}\right)^2}, \quad (4)$$

where $dl = L_1 - L_2,$ $dh = \begin{cases} \sqrt{de^2 - dl^2 - dc^2} & \text{if } de^2 > dl^2 + dc^2 \\ 0 & \text{else} \end{cases},$ $de = \sqrt{(L_1 - L_2)^2 + (a_1 - a_2)^2 + (b_1 - b_2)^2},$ $dc = c_2 - c_1$ $= \sqrt{a_1^2 + b_1^2} - \sqrt{a_2^2 + b_2^2},$ and $kl = kc = kh = 1,$ $sl = 1,$ $sc = 1 + 0.045 \cdot c,$ $sh = 1 + 0.015 \cdot c,$ where $c = \sqrt{c_1 \cdot c_2}.$ With the help of the CIE 1994 color difference model, the quantization in relation (3) above can be further formulated as minimizing the difference between the real luminance value y and the luminance value represented by 8-bit $[R, G, B]^T$, with the constraint that the color difference between them, expressed in DE*94, is smaller than a Threshold as shown by example in relation (5) below:

$$\begin{bmatrix} R \\ G \\ B \end{bmatrix} = \arg \min_{\substack{R,G,B \in Z \\ DE^*94 < Threshold}} \left\| y - M_1 \cdot \begin{bmatrix} R \\ G \\ B \end{bmatrix} \right\|, \quad (5)$$

In order to reduce the computation needed for this minimization for real-time TV signal conversion, a simpler format is provided herein below.

The main idea is same as above, however DE* 94 is not calculated. Instead, a small range is defined as:

$[R, G, B]^T: \lfloor r \rfloor \leq R \leq \lceil r \rceil, \lfloor g \rfloor \leq G \leq \lceil g \rceil$ and $\lfloor b \rfloor \leq B \leq \lceil b \rceil$, where $\lfloor \cdot \rfloor$ is the nearest quantization level that is less than or equal to and $\lceil \cdot \rceil$ is the nearest quantization level that is less than or equal to $\cdot$. In other words, [R,G,B] can take values only at the eight vertices of the unit cube that contains high precision value $[r,g,b]^T$. Then, the minimization is according to example relation (6) below:

$$\begin{bmatrix} R \\ G \\ B \end{bmatrix} = \arg \min_{\substack{R,G,B \in Z \\ \lfloor r \rfloor \leq R \leq \lceil r \rceil \\ \lfloor g \rfloor \leq G \leq \lceil g \rceil \\ \lfloor b \rfloor \leq B \leq \lceil b \rceil}} \left\| y - M_1 \cdot \begin{bmatrix} R \\ G \\ B \end{bmatrix} \right\|. \quad (6)$$

This minimization problem can be solved by an exhaustive search, wherein the resulting signals from the quantization method contain color values that have higher precision on luminance value than conventional methods. The error in luminance value (Y) of an individual pixel is then contained in a smaller range than the conventional direct rounding quantization. Considering the 24-bit RGB quantization example, then:

$\Delta RGB = [R - \lfloor r \rfloor, G - \lfloor g \rfloor, B - \lfloor b \rfloor]^T,$ such that the difference in luminance is:

$\Delta Y = M_1 \cdot \Delta RGB.$

Table. I summarizes the illuminance difference $\Delta y$ between the 8 different possible quantized RGB colors and colors $[\lfloor r \rfloor, \lfloor g \rfloor, \lfloor b \rfloor]^T$:

TABLE I

LUMINANCE DIFFERENCES FOR EACH POSSIBLE QUANTIZATION RGB VALUE COMPARED WITH $[\lfloor r \rfloor, \lfloor g \rfloor, \lfloor b \rfloor]^T$.

| | ΔRGB | | | | | | |
|---|---|---|---|---|---|---|---|
| | [0, 0,0] | [0, 0,1] | [0,1,0] | [0,1,1] | [1,0,0] | [1,0,1] | [1,1,0] | [1, 1,1] |
| Δy | 0 | 0.114 | 0.587 | 0.701 | 0.299 | 0.413 | 0.886 | 1 |

Because the quantization process minimizes the luminance difference $\Delta y$, the achievable luminance steps $\delta y$ are much smaller than can be represented by 8-bit Y value. The values $\delta y$ in Table I are sorted and $\delta y$ values are calculated and shown in Table II below:

TABLE II

REACHABLE LUMINANCE STEPS.

| | Index. | | | | | | | |
|---|---|---|---|---|---|---|---|---|
| | 0 | 1 | 2 | 3 | 4 | 5 | 6 | 7 |
| Δy | 0 | 0.114 | 0.299 | 0.413 | 0.587 | 0.701 | 0.886 | 1 |
| δy | | 0.114 | 0.185 | 0.114 | 0.174 | 0.114 | 0.185 | 0.114 |

As can be seem in Table II, the biggest luminance step $\delta y$ is 0.185. Its equivalent bit-depth of luminance value Y is increased by $\delta d$ bit, where:

$\delta d = \log_{0.5} 0.185$ $= 2.43$ bit.

Therefore, the quantized 8-bit RGB values preserve luminance precision as high as 8+2.43=10.43 bit.

Using the above example method according to the present invention, a YUV signal can be converted to an RGB signal, preserving high precision luminance values while keeping small color differences. The high precision luminance is achieved at the expense of the precision of chrominance, which is less sensitive in human eyes.

Because the conventional color conversion from YUV color space to RGB color space is very commonly used in various hardware and chips, to achieve the same luminance preserving results for the existing conventional YUV to RGB conversion methods, the present invention further provides a pre-quantization method for the input YUV signals to the conventional YUV to RGB conversion, and a requantization method for the output RGB signals from the conventional YUV to RGB conversion. The pre-quantization for YUV signal can be performed before the input YUV signal to the existing chips if the conventional color conversion is performed immediately after the input. Alternatively, the re-quantization of RGB signal can be performed after the output RGB signal of the existing chips if the conventional color conversion is performed immediately before output.

Figure 2:
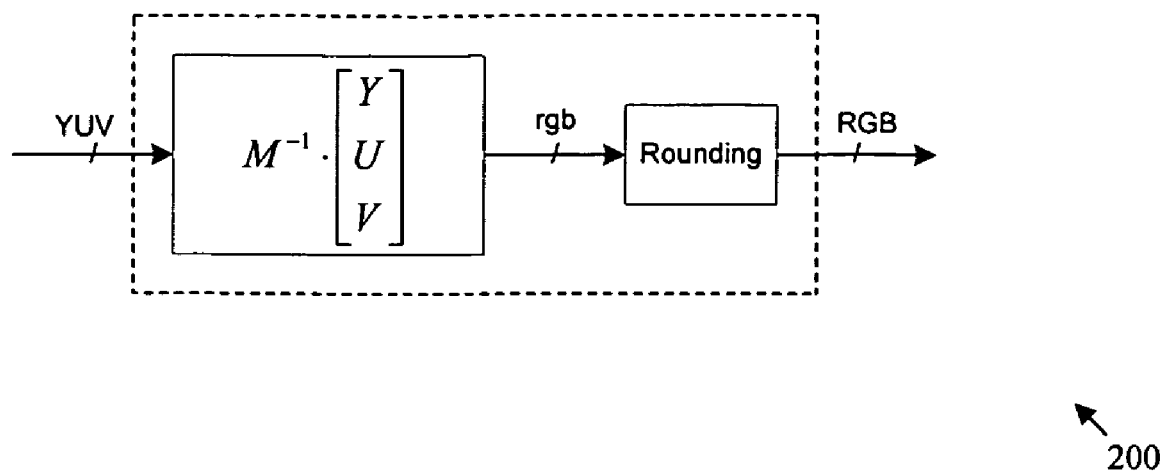
FIG. 2 shows a block diagram of a conventional color conversion method from YUV space to RGB space, where simple rounding is used after double precision rgb is obtained.
Figure 3:
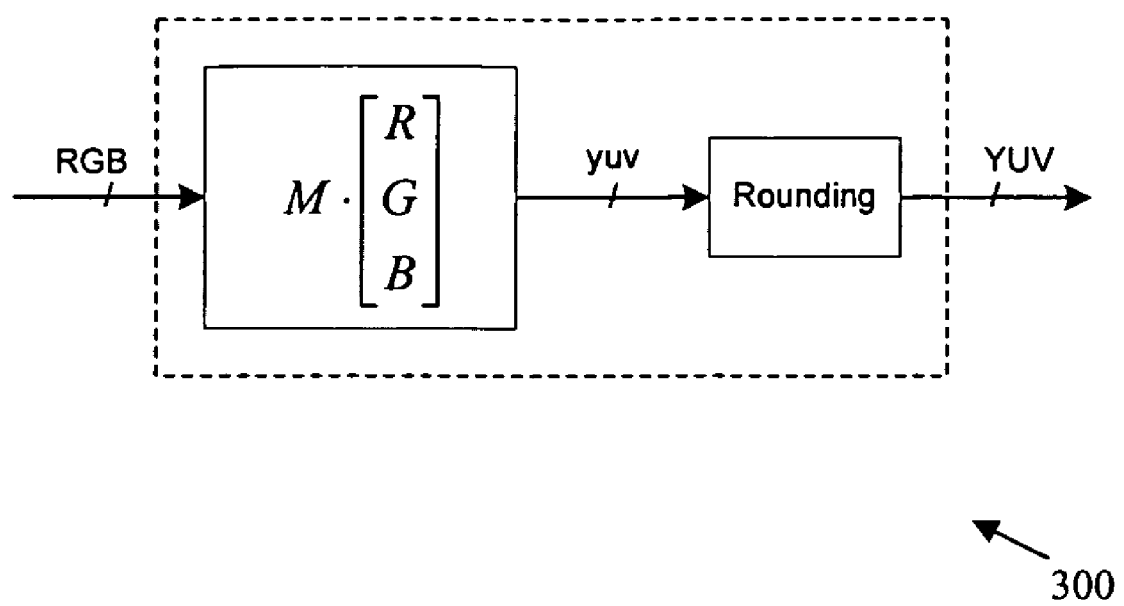
FIG. 3 shows a block diagram of a conventional color conversion method from RGB space to YUV space, where simple rounding is used after double precision yuv is obtained.

Conventional YUV to RGB color conversion comprises of a transformation and a rounding process. FIG. 2 shows a block diagram of a conventional system 200 for color conversion from YUV space to RGB space, where simple rounding is used after double precision rgb is obtained. Further, FIG. 3 shows a block diagram of a conventional system 300 for color conversion from RGB space to YUV space, where simple rounding is used after double precision yuv is obtained.

FIG. 4(a) shows a functional block diagram of a system 400 for pre-quantization of high precision YUV color to a same precision YUV color which includes a luminance preserving conversion block 410 in addition to a conventional RGB to YUV color conversion block 200 that performs a transformation process and a rounding process. Further, FIG. 4(b) shows a functional block diagram of an example system 450 wherein the pre-quantization block 400 of FIG. 4(a) is used with an existing system 455 that includes a conventional YUV to RGB color conversion block 300 (FIG. 3).

Referring back to FIG. 4(a), the input YUV signal is first converted to RGB signal with the same precision as the output in FIG. 4(b), using the luminance preserving conversion block 410, wherein in this example, block 410 implements the YUV to RGB conversion luminance preserving function of the block 100 in FIG. 1. The RGB output from block 410 in FIG. 4(a) is then converted to a YUV signal using the conventional color conversion block 200. For an existing hardware or chip that takes a quantized YUV signal as input, and performs conventional YUV to RGB color conversion immediately thereafter, a pre-quantization block 400 according to an embodiment of the present invention is added before the conventional conversion block 300 (FIG. 4(b)) in that hardware such that the RGB signals converted after block 300 are the same as if the hardware is using the luminance preserving conversion from YUV to RGB according to the present invention. To achieve luminance preserving RGB values in the output of system 450 in FIG. 4(b), the two consecutive conventional color conversion blocks 200 and 300 should be equivalent to an identity transformation, as shown by example in FIG. 4(c).

As such, first, according to FIG. 4(a), the input YUV signal is converted to an RGB signal using the example luminance preserving conversion block 410 according to the present invention, and then converted back to YUV signal using the conventional color conversion block 200. FIG. 4(b) illustrates the entire procedure, including the pre-processing block 400 and the conventional color conversion 300 in the existing hardware 455. In order to make the generated RGB signal exactly the same as the resulting RGB signal after the luminance preserving conversion within the pre-processing block 400, the two sequentially connected conventional color conversions blocks 200, 300, back and forth between RGB and YUV color space should be equivalent to an identity transformation as shown in FIG. 4(c).

Because of the limited precision of the signal, considering the conversion matrix between RGB and YUV color space, as in relation (2) above, in one example the basis of YUV space: $[\vec{y}, \vec{u}, \vec{v}]^T$ has coordinates in RGB space as:

$$\vec{y} = \begin{bmatrix} 1 \\ 1 \\ 1 \end{bmatrix}, \quad \vec{u} = \begin{bmatrix} 0 \\ -0.345 \\ 1.779 \end{bmatrix}, \quad \vec{v} = \begin{bmatrix} 1.407 \\ -0.717 \\ 0 \end{bmatrix}.$$

Their norms can be calculated as:

$$\|\vec{y}\| = 1.732, \|\vec{u}\| = 1.812, \|\vec{v}\| = 1.5792$$

with the three angles among the basis vectors as 117, 104 and 95 degrees. The YUV color space is much coarser than the RGB space if the same bit-depth of data are used to present color. Therefore, in order to make the two sequentially connected conventional color converters 200, 300 shown on the left side of FIG. 4(c) equivalent to the unity operation shown on the right side of FIG. 4(c), higher precision YUV values than RGB values are used. Generally, 1-bit more precision makes the YUV color space finer than the RGB color space.

Similarly, for an existing hardware or chip that processes the color signal in YUV space and outputs RGB colors using a conventional color conversion method, the output RGB color can be re-quantized so that the resulting RGB color after re-quantization preserves high precision luminance from the YUV signal in the hardware. FIG. 5(a) shows a block diagram of an example system 500 according to the present invention for re-quantization of RGB color to a same precision RGB color. The input RGB color is first converted to lower or same precision YUV using a conventional color conversion block 300 and then the resulting YUV color is converted back to RGB color using the conversion block 410 which in this example implements the YUV to RGB conversion luminance preserving function of the block 100 in FIG. 1.

FIG. 5(b) shows a block diagram of an example system 550 according to the present invention wherein the re-quantization block 500 of FIG. 5(a) is used immediately after the conventional YUV to RGB conversion block 200 in the hardware. As such, the example in FIG. 5(a) shows the post-processing step of RGB re-quantization according to the present invention, and the example in FIG. 5(b) shows the entire procedure including the conventional conversion block 200 in the hardware, and the post-processing step in block 500 according to the present invention. Similar to FIG. 4(c), the example in FIG. 5(c) illustrates the equivalence of the two sequentially connected conventional color conversion blocks 200, 300, and the identity transformation. In this case, because the RGB space is finer than YUV space, higher or same precision RGB is acceptable.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed:

1. A method of color conversion from YUV color space to RGB color space, comprising the steps of:
   receiving a image signal comprising YUV signals having a first precision;
   converting the image signal into a quantized RGB signal having a second precision, such that the luminance of the image signal is essentially preserved in the quantized RGB signal; and during the converting step:
   determining a set of possible RGB signal values for the quantized signal such that the difference in chrominance before and after conversion is constrained; and
   selecting an RGB signal value from the above possible RGB signal values that essentially minimizes the difference in luminance before and after conversion.

2. A method of color conversion from YUV color space to RGB color space, comprising the steps of:
   receiving a image signal comprising YUV signals having a first precision;
   converting the image signal into a quantized RGB signal having a second precision, such that the luminance of the image signal is essentially preserved in the quantized RGB signal;
   during the converting step, determining a set of possible RGB signal values for the quantized signal such that the difference in chrominance before and after conversion is constrained, and selecting an RGB signal value from the above possible RGB signal values that essentially minimizes the difference in luminance before and after conversion;
   wherein the set of possible RGB signal values (R,G,B) for the quantized RGB signal is within a range defined as:

$\lfloor r \rfloor \leq R \leq \lceil r \rceil, \lfloor g \rfloor \leq G \leq \lceil g \rceil$ and $\lfloor b \rfloor \leq B \leq \lceil b \rceil$ wherein r, g and b represent the image signal values.

3. A method of RGB color signal re-quantization comprising the steps of:
   receiving a first YUV signal;
   converting the first YUV signal to a first RGB signal;
   converting the first RGB signal to a second YUV signal; and
   converting the second YUV signal to a second RGB signal, such that the luminance in the first YUV signal is essentially preserved in the second RGB signal.

4. A method of color conversion from YUV color space to RGB color space, comprising the steps of:
   receiving a image signal comprising first YUV signals having a first precision;
   converting the image signal into a quantized RGB signal having a second precision, such that the luminance of the image signal is essentially preserved in the quantized RGB signal; and
   converting the quantized RGB signal into a second YUV signal.

5. A video image color conversion system, comprising:
   a converter that receives an image signal comprising YUV signals having a first precision, and converts the image signal into a quantized RGB signal having a second precision, such that the luminance of the image signal is essentially preserved in the quantized RGB signal;
   wherein the converter further determines a set of possible RGB signal values for the quantized signal such that the difference in chrominance before and after conversion is constrained, and further selects an RGB signal value from the above possible RGB signal values that essentially minimizes the difference in luminance before and after conversion.

6. A video image color conversion system, comprising:
   a converter that receives an image signal comprising YUV signals having a first precision, and converts the image signal into a quantized RGB signal having a second precision, such that the luminance of the image signal is essentially preserved in the quantized RGB signal, wherein the converter further determines a set of possible RGB signal values for the quantized signal such that the difference in chrominance before and after conversion is constrained, and further selects an RGB signal value from the above possible RGB signal values that essentially minimizes the difference in luminance before and after conversion;
   wherein the set of possible RGB signal values (R,G,B) for the quantized RGB signal is within a range defined as:

$\lfloor r \rfloor \leq R \leq \lceil r \rceil, \lfloor g \rfloor \leq G \leq \lceil g \rceil$ and $\lfloor b \rfloor \leq B \leq \lceil b \rceil$ wherein r, g and b represent the image signal values.

7. A video image color signal re-quantization system, comprising:
   a YUV to RGB converter that converts an image YUV signal to a first RGB signal;
   an RGB to YUV converter that converts the first RGB signal into a second YUV signal; and
   a luminance preserving YUV to RGB converter that converts the second YUV signal to an output RGB signal.

8. A video image color conversion system, comprising:
   a converter that receives an image signal comprising YUV signals having a first precision, and converts the image signal into a quantized RGB signal having a second precision, such that the luminance of the image signal is essentially preserved in the quantized RGB signal; and
   an RGB to YUV converter that converts the quantized RGB signal into a second YUV signal.

9. A method of RGB color signal re-quantization, comprising:
   receiving a first YUV signal;
   converting the first YUV signal to a first RGB signal;
   converting the first RGB signal to a second YUV signal; and
   converting the second YUV signal to a second RGB signal, such that the luminance in the first YUV signal is essentially preserved in the second RGB signal,
   the first YUV color signal has a first precision, and
   the first RGB color signal has a second precision not less than the first precision.

10. The method of color conversion from YUV color space to RGB color space recited in claim 4, wherein the quantized RGB signal is a first RGB signal, the method further comprises the step of:

converting the second YUV signal to a second RGB signal.

11. A method of color conversion from YUV color space to RGB color space, comprising the steps of:

receiving an image signal comprising first YUV signals having a first precision;

converting the image signal into a quantized RGB signal having a second precision, such that the luminance of the image signal is essentially preserved in the quantized RGB signal; and converting the quantized RGB signal into a second YUV signal, wherein the Quantized RGB signal is a first RGB signal, the method further comprises the step of:

converting the second YUV signal to a second RGB signal, wherein the quantized RGB color signal has a precision less than the first precision.

12. The method of color conversion from YUV color space to RGB color space recited in claim 11 wherein:

the second YUV signal has a precision greater than the precision of the quantized RGB signal; and the second RGB signal has a precision less than the precision of the second YUV signal.

13. A video image color signal re-quantization system, comprising:

a YUV to RGB converter that converts an image YUV signal to a first RGB signal;

a RGB to YUV converter that converts the first RGB signal into a second YUV signal; and a luminance preserving YUV to RGB converter that converts the second YUV signal to an output RGB signal, wherein:

the first RGB color signal has a first precision;

the second YUV color signal has a second precision not less than the first precision; and the output RGB color signal has a third precision not greater than the second precision.

14. The video image color conversion system recited in claim 8 wherein the quantized RGB signal is a first RGB signal and the system further comprises:

a YUV to RGB converter that converts the second YUV signal to a second RGB signal.

* * * * *